No. 703,206. Patented June 24, 1902.
P. H. KEEFE.
BEER TAPPING APPARATUS.
(Application filed Oct. 22, 1901.)
(No Model.)
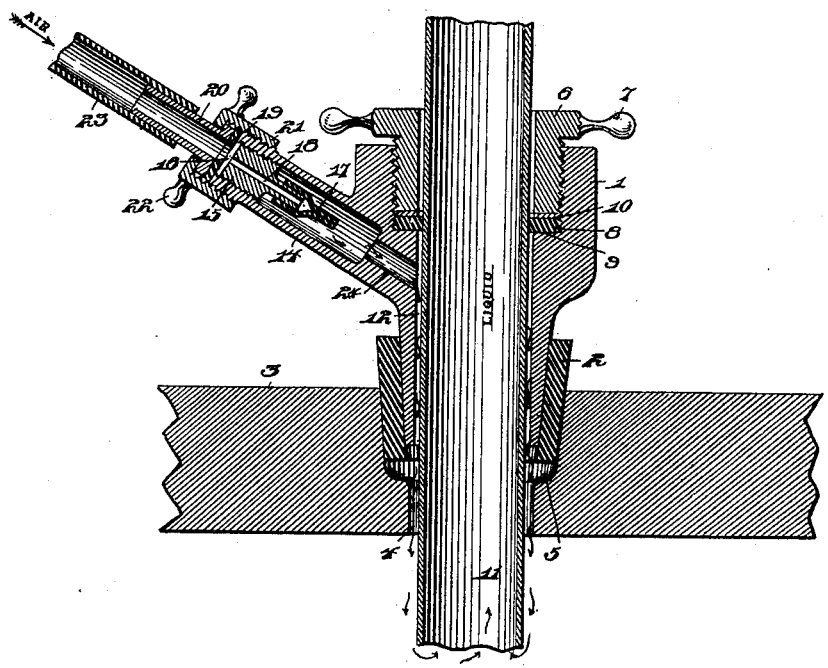
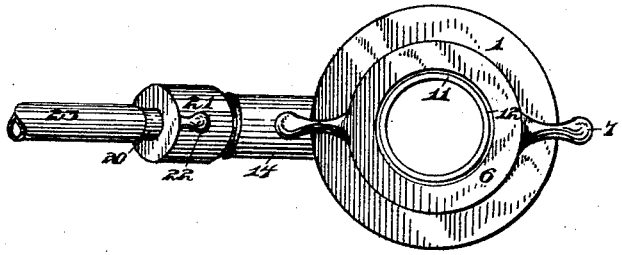

UNITED STATES PATENT OFFICE.

PATRICK H. KEEFE, OF SHARPSBURG, PENNSYLVANIA.

BEER-TAPPING APPARATUS.

SPECIFICATION forming part of Letters Patent No. 703,206, dated June 24, 1902.

Application filed October 22, 1901. Serial No. 79,519. (No model.)

*To all whom it may concern:*

Be it known that I, PATRICK H. KEEFE, a citizen of the United States of America, residing at Sharpsburg, in the county of Allegheny and State of Pennsylvania, have invented certain new and useful Improvements in Beer-Tapping Apparatus, of which the following is a specification, reference being had therein to the accompanying drawings.

This invention relates to certain new and useful improvements in beer-tapping apparatus wherein an air-supply is in communication with the cask or barrel containing the beer or like liquid, and has for its object to provide means for furnishing a constant supply of air to the liquid, so that the latter may be drawn off through a pipe, which conducts the same to a suitable and convenient point.

A further object of my invention is to construct an apparatus of this nature which will be extremely simple in its construction, strong, durable, efficient in its operation, and comparatively inexpensive to manufacture.

In describing the invention in detail reference is had to the accompanying drawings, forming a part of this specification, and wherein like numerals of reference indicate like parts throughout both views, in which—

Figure 1 is a transverse vertical sectional view of my improved device, showing a portion of the cask or barrel with the device secured in position therein. Fig. 2 is a top plan view of the device.

To put my invention into practice, I provide a bushing or sleeve 1, having an enlarged upper end, said upper end having its exterior lying in a vertical plane, the lower edge of which is curved inwardly and merges in a tapered lowered end, upon which is mounted a collar or sleeve 2, which is adapted to be composed of rubber or other suitable compressible and resilient material. The liquids which are drawn off under pressure of air are as a rule shipped in casks or barrels, the bung-hole of which is countersunk to receive the drawing-off apparatus connected to the air-supply.

In the accompanying illustration I have therefore shown a part of a barrel 3, the bung-hole 4 of which is countersunk, as at 5, and the sleeve 2 is adapted to fit neatly within this countersunk portion, as shown in Fig. 1 of the drawings, effectually sealing and preventing the escaping of the air exterior of the drawing-off tube. The enlarged end of the bushing 1 is provided with an interiorly-threaded annular recess or opening adapted to receive an exteriorly-threaded nut 6, provided with suitable handles 7 for operating the same. The gasket or washer 8 is placed on the shoulder 9, formed within the sleeve, and a metallic washer 10 is placed upon the resilient washer 9, so as to receive frictional contact of the nut 6 and prevent injury to the resilient washer as the nut is screwed down to press the resilient washer and effect the seal. The drawing-off tube 11 extends through the nut 6 and through the bore of the sleeve 1, which is of the same diameter throughout its length, into the barrel or cask 3. This drawing-off tube leads to a faucet (not shown) located at a suitable point. Outside diameter of this tube 11 is less than the diameter of the bore through the sleeve or bushing 1, so as to form an annular space 12, surrounding the drawing-off tube, which space is closed at its upper end by the washer 10, which when the nut 6 is tightened is pressed firmly against the exterior of the drawing-off tube 11. The bushing or sleeve 1 is provided with an upwardly-inclined tubular projection 14, the inner end of which is formed integral with the enlarged portion of the bushing or sleeve 1. The bore of this inclined tubular projection is of varying diameters, the outer portion of the bore thereof being of the greater diameter and having its inner end terminating at a point within the thickened portion of the sleeve 1 and communicating with a smaller inclined bore located within the said sleeve. The outer end of this projection is threaded both exteriorly and interiorly. A plug 15 is threaded into the outer end of said tubular projection 14, and in order to permit an easy manipulation thereof is preferably provided with a groove 16, in which a screw-driver or like instrument may be inserted for screwing the plug into or unscrewing it from position. This plug has a reduced inner end, upon which is mounted a flap or other form of valve 17, which readily opens to admit air, but is closed against back pressure of the air. The block 15 is provided throughout its length with a central orifice 18. A rubber or other gasket 19 is placed against the outer end of the tubular projection 14 and a nipple 20 placed upon this gasket, the parts being firmly secured in position by means of a cap-nut 21, interiorly threaded to engage the exterior threads on the tubular projection and having suitable handles 22 projecting therefrom. The nipple 20 is adapted to receive a hose 23, which connects the device with the air-pipe.

In operation it will be observed that the air from the air-tank (not shown) enters through the tube 23, nipple 20, through the orifice 18, orifice 24, and into the annular space 12, surrounding the drawing-off tube, and this space being sealed at the upper end by the washer 10 the air is directed downwardly into the barrel or cask, as indicated by the arrows, and can only escape by passage into the drawing-off tube at the lower end thereof.

Heretofore in the construction of many devices of this character it has been impossible to use the same in kegs or casks that were located within coolers by reason of the extreme height of the device. With my improved construction it will be observed that the device projects but a short distance from the top of the barrel or cask, thus enabling its use in many instances that could not otherwise be had, and in use the drawing-off tube 11 is inserted through the lid or cover of the cooler.

In the practice of my invention it will be noted that various changes may be made in the details of construction without departing from the general spirit of my invention.

Having fully described my invention, what I claim as new, and desire to secure by Letters Patent, is—

In a beer-tapping apparatus, the combination with a flexible collar engaging in the bung-hole of a barrel, of a bushing having an enlarged upper end, the lower edge of which is curved inwardly and merges in an inclined lower end, said enlarged end provided with an interiorly-threaded annular recess communicating with the central bore of the bushing, said central bore being of smaller diameter than the said recess and of the same diameter throughout its length, a flexible washer seated in the said recess, and engaging the periphery of a drawing-tube arranged in the bushing-bore, a tightening-nut engaged in the said threaded recess, and an upwardly-inclined tubular projection having an externally and internally screw-threaded outer end, and its inner end formed integral with the enlarged upper end of the said bushing, said tubular projection provided with an inclined bore, communicating with a downwardly-inclined bore in the said enlarged portion, said drawing-off tube and said bushing having a space therebetween communicating with the inclined bore of the said tubular projection, substantially as described.

In testimony whereof I affix my signature in the presence of two witnesses.

PATRICK H. KEEFE.

Witnesses:
JOHN NOLAND,
E. E. POTTER.